United States Patent
Prasad et al.

(10) Patent No.: US 7,961,618 B1
(45) Date of Patent: Jun. 14, 2011

(54) SYSTEM, METHOD AND COMPUTER-READABLE MEDIUM FOR ON-DEMAND DYNAMIC BANDWIDTH ALLOCATION IN A NETWORK OF ANTENNAS FOR MULTIPLE BASE TRANSCEIVER STATIONS

(75) Inventors: Sunil D. Prasad, Ashburn, VA (US); Mark L. Jones, Overland Park, KS (US)

(73) Assignee: Nextel Communications Inc., Reston, VA (US)

( * ) Notice: Subject to any disclaimer, the term of this patent is extended or adjusted under 35 U.S.C. 154(b) by 959 days.

(21) Appl. No.: 11/477,775

(22) Filed: Jun. 30, 2006

(51) Int. Cl.
*H04L 12/26* (2006.01)
*H04W 72/00* (2009.01)

(52) U.S. Cl. ..... 370/235; 370/252; 370/468; 455/452.1; 455/454

(58) Field of Classification Search .......... 370/230–235, 370/252, 254, 329, 468; 709/224, 226, 232–234; 455/450–454, 560–562.1
See application file for complete search history.

(56) References Cited

U.S. PATENT DOCUMENTS

| | | | |
|---|---|---|---|
| 6,088,335 A * | 7/2000 | I et al. ............................ | 370/252 |
| 6,088,345 A * | 7/2000 | Sakoda et al. ................. | 370/335 |
| 6,842,428 B2 * | 1/2005 | Chen et al. ..................... | 370/252 |
| 6,973,037 B1 * | 12/2005 | Kahveci ........................ | 370/236 |
| 7,027,409 B2 * | 4/2006 | Cain ............................. | 370/252 |
| 7,133,395 B2 * | 11/2006 | Simonsen et al. ............. | 370/345 |
| 7,395,067 B2 * | 7/2008 | Weigand ....................... | 455/443 |
| 7,567,581 B2 * | 7/2009 | Patenaude ..................... | 370/419 |
| 7,570,956 B2 * | 8/2009 | Bigham et al. ................ | 455/453 |
| 7,596,088 B2 * | 9/2009 | Agmon et al. ................. | 370/230 |
| 2003/0114165 A1 * | 6/2003 | Mills ............................ | 455/453 |
| 2005/0259684 A1 * | 11/2005 | Csapo ........................... | 370/468 |
| 2006/0120321 A1 * | 6/2006 | Gerkis et al. .................. | 370/329 |
| 2007/0003283 A1 * | 1/2007 | Feuer et al. .................... | 398/83 |
| 2007/0070908 A1 * | 3/2007 | Ghosh et al. .................. | 370/236 |
| 2007/0213069 A1 * | 9/2007 | Ji et al. ......................... | 455/450 |
| 2008/0107014 A1 * | 5/2008 | Huang et al. .................. | 370/216 |
| 2010/0008263 A1 * | 1/2010 | Weigand ....................... | 370/254 |

* cited by examiner

*Primary Examiner* — Gregory B Sefcheck

(57) ABSTRACT

A system, method and computer-readable medium for sharing bandwidth resources among a plurality of antennas in a network of base transceiver stations are provided. According to the method, a bandwidth allocation of each of a plurality of antennas is determined, and a bandwidth demand on each of the plurality of antennas is monitored. If the bandwidth demand of one or more of the antennas exceeds a first threshold, the bandwidth allocation of those antennas is increased, based upon the bandwidth demand. If the bandwidth demand of another one or more of the antennas drops below a second threshold, the bandwidth allocation of those antennas is decreased. Accordingly, the bandwidth resources available to the network of antennas may be dynamically allocated, based upon the bandwidth demand in the network.

18 Claims, 3 Drawing Sheets

US 7,961,618 B1

SYSTEM, METHOD AND COMPUTER-READABLE MEDIUM FOR ON-DEMAND DYNAMIC BANDWIDTH ALLOCATION IN A NETWORK OF ANTENNAS FOR MULTIPLE BASE TRANSCEIVER STATIONS

BACKGROUND OF THE INVENTION

The present invention relates to a network of distributed antennas. More specifically, the present invention relates to a system, method and computer-readable medium for allocating bandwidth among a plurality of antennas for base transceiver stations.

Traffic loads vary significantly in some locations across large wireless networks. Today, the transport and switching facilities must be deployed to address the maximum demand in every location. However, it is known that traffic loads vary by time and day in different areas. For example, some city downtown areas or commercial districts have heavy wireless phone usage during business hours, but only small demands at other times. As wireless broadband services grow, the need for dynamic allocation of bandwidth between base transceiver stations and the distributed antenna systems will become critical to avoid wasting or exhausting capacity.

Today's distributed antenna systems provide static bandwidth capabilities between a base transceiver station (BTS) and the antennas. They do not provide a mechanism for dynamic on-demand bandwidth allocation among multiple BTSs and the transport to the antennas.

SUMMARY OF THE INVENTION

The present invention provides on-demand allocation of bandwidth among multiple BTSs and distributed antennas across the transport media to support wireless broadband services as well as traditional wireless services.

The present invention could be used for sharing of switching facilities among wireless BTSs and transport between the BTSs and the RF antenna sites. As BTSs carry increased loads of broadband traffic for wireless service, it becomes increasingly important to drive efficiencies in the use of available bandwidth between the BTSs and the distributed antennas, to provide coverage on demand as needed. This invention may be leveraged for any Radio Frequency spectrum, wireless product, or wireless technology (for example, Code Division Multiple Access, Evolution Data Optimized (EVDO), Global System for Mobile communications (GSM)/Universal Mobile Telecommunications Service (UMTS), iDEN, WiMAX, etc.). It can work with any base station, including Software Defined Radio systems.

Other objects, advantages and novel features of the present invention will become apparent from the following detailed description of the invention when considered in conjunction with the accompanying drawings.

DETAILED DESCRIPTION OF THE EXEMPLARY EMBODIMENTS

This invention describes the sharing of switching facilities at the wireless base transceiver station (BTS) and transport between the BTS and the RF antenna site. It applies in those cases where the BTS is connected to multiple antennas with inconsistent loading characteristics (i.e., with maximum loads not consistently coinciding with each other in time). The present invention provides sufficient BTS capacity to address the maximum demand across the entire set of antennas it services (i.e., max BTS demand as a function of time) and not just the sum of the maximum amount from each one (i.e., sum of max antenna demands), along with some buffer of excess capacity for variations in load. The antenna capacity allocation of the present invention, by considering antenna demand over time, provides a more efficient and cost-effective use of the bandwidth of communication links coupling the distributed antennas and BTSs compared to conventional static allocation which must reserve the maximum anticipated bandwidth regardless of actual usage.

Figure 1:
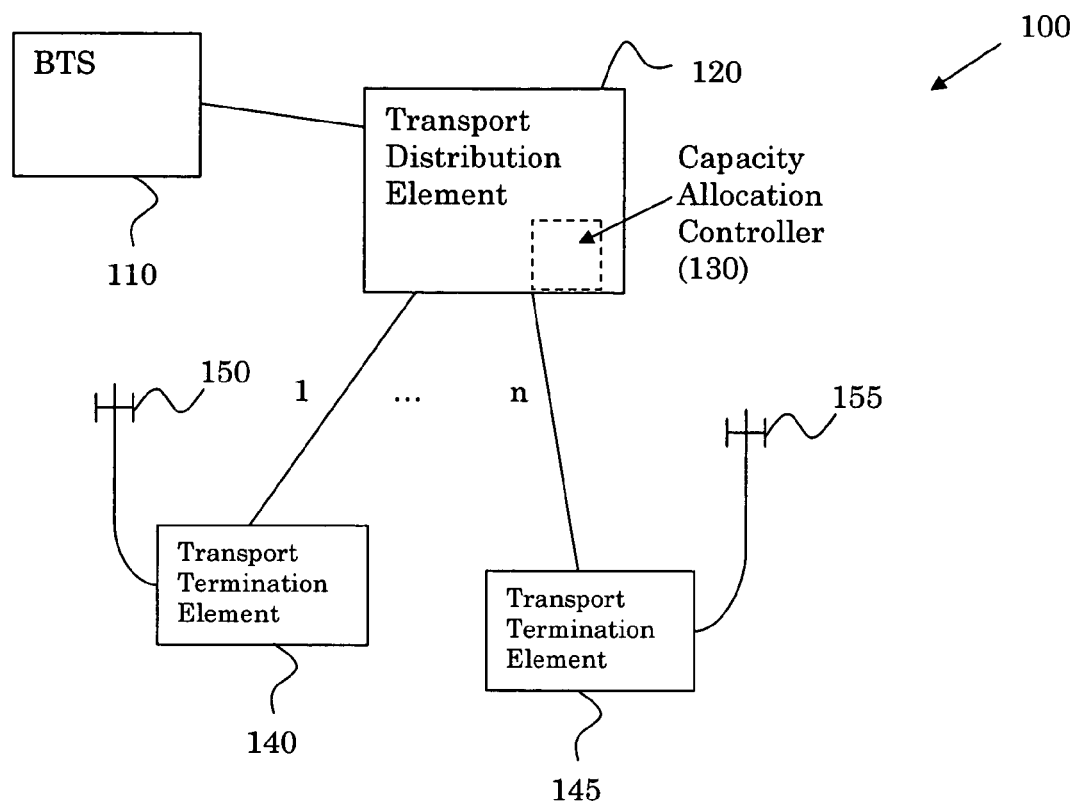
FIG. 1 illustrates an exemplary embodiment of a system for allocating bandwidth among a plurality of antennas, in accordance with the present invention.

FIG. 1 illustrates an exemplary embodiment of a system for allocating bandwidth among a plurality of antennas, in accordance with the present invention. As illustrated in FIG. 1, a system 100 for allocating bandwidth among a plurality (1 . . . n) of antennas, e.g., 150, 155 includes a BTS 110, a Transport Distribution Element 120 and a plurality (1 . . . n) of Transport Termination Elements, e.g., 140, 145. Each of the Transport Termination Elements 140, 145 is associated with one of the plurality of antennas 150, 155. The Transport Termination Elements 140, 145 provide connections from the antennas 150, 155 to the Transport Distribution Element 120 and signal routing to the antennas. The Transport Termination Elements 140, 145 may be routers, Ethernet switches, or Synchronized Optical Network (SONET) line terminals, for example.

The Transport Distribution Element 120 may include a Capacity Allocation Controller 130, which monitors the bandwidth demand on each of the plurality of antennas and increases or decreases the bandwidth allocation thereof, as needed, based on the bandwidth demand. FIG. 1 illustrates a hub and spoke type of system, but this type of system is merely exemplary. Although only one BTS is illustrated in FIG. 1, the system may include a plurality of BTSs.

Figure 2:
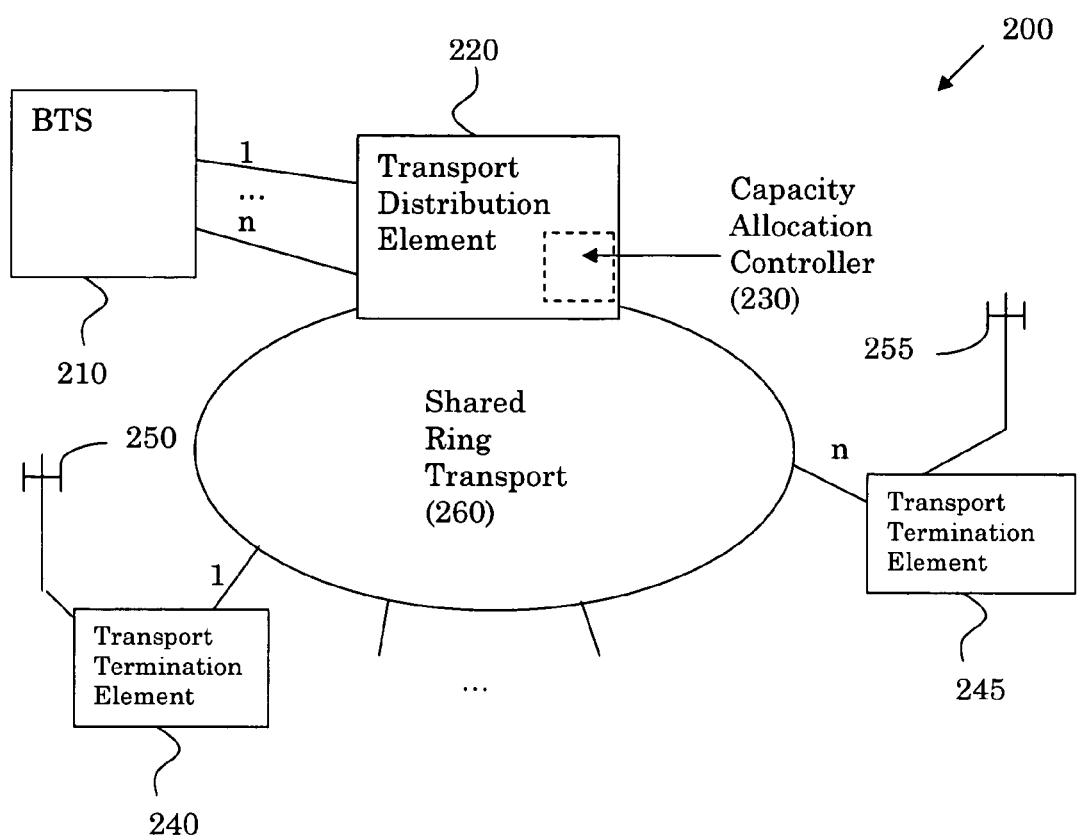
FIG. 2 illustrates another exemplary embodiment of a system for allocating bandwidth among a plurality of antennas, in accordance with the present invention.

FIG. 2 illustrates another exemplary embodiment of a system for allocating bandwidth among a plurality of antennas, in accordance with the present invention. This system 200 includes a BTS 210 and a plurality (1 . . . n) of antennas, e.g., 250, 255 connected via a Shared Ring Transport 260. Each of the antennas 250, 255 is connected to a Transport Termination Element 240, 245, respectively. The Transport Termination Elements 240, 245 may be routers, Ethernet switches, or SONET line terminals, for example. The BTS 210 is connected to a Transport Distribution Element 220, which includes a Capacity Allocation Controller 230, which monitors the bandwidth demand on each of the plurality of antennas 250, 255. The Capacity Allocation Controller 230 increases or decreases the bandwidth allocation to each of the antennas 250, 255, as needed, based on the bandwidth demand thereof. Although only one BTS is illustrated in FIG. 2, the system 200 may include a plurality of BTSs.

Signaling connections and some minimal capacity should be maintained from the BTS to all antennas in the set, but the data carrying capacity can be varied based on demand at each antenna, either based on a fixed schedule or controlled by a dynamic algorithm, or both. The capacity sharing might be enabled by one of many technologies. If wireless connections are used between the BTS and antennas, the number of carriers or subcarries between the BTS and each antenna might be adjusted. If the connections are optical fiber, the number of wavelengths or the bit rate applied to each wavelength between the BTS and each antenna might be varied.

If channelized SONET/Synchronous Digital Hierarchy (SDH) ports are used between the BTS and antennas, one might adjust the capacity to each antenna using signaling to a digital cross connect that uses virtual concatenation (VCAT), generic framing procedure (GFP), and a link capacity adjustment scheme (LCAS). SDH is defined by international standards for transmission of digital information over optical networks. SONET, a high-speed baseband digital transport standard which specifies incrementally increasing data stream rates for movement across digital optical links, is the North American version of SDH defined by American National Standards. VCAT allows for the assigning of time slots that are not necessarily contiguous. GFP allows data to be broken down into smaller pieces like packets that get mapped into time slots. LCAS allows changing the number of time slots assigned without tearing down a connection.

Alternatively, one might use a packet network infrastructure where the capacity between the BTS and each antenna might be controlled over a Multiprotocol Label Switching (MPLS) network via Explicitly-routed Label Switch Paths (E-LSP), Resource Reservation Protocol-Traffic Extension (RSVP-TE) protocol, or Constraint-based Label Distribution Protocol (CR-LDP) signaling, for example.

Figure 3:
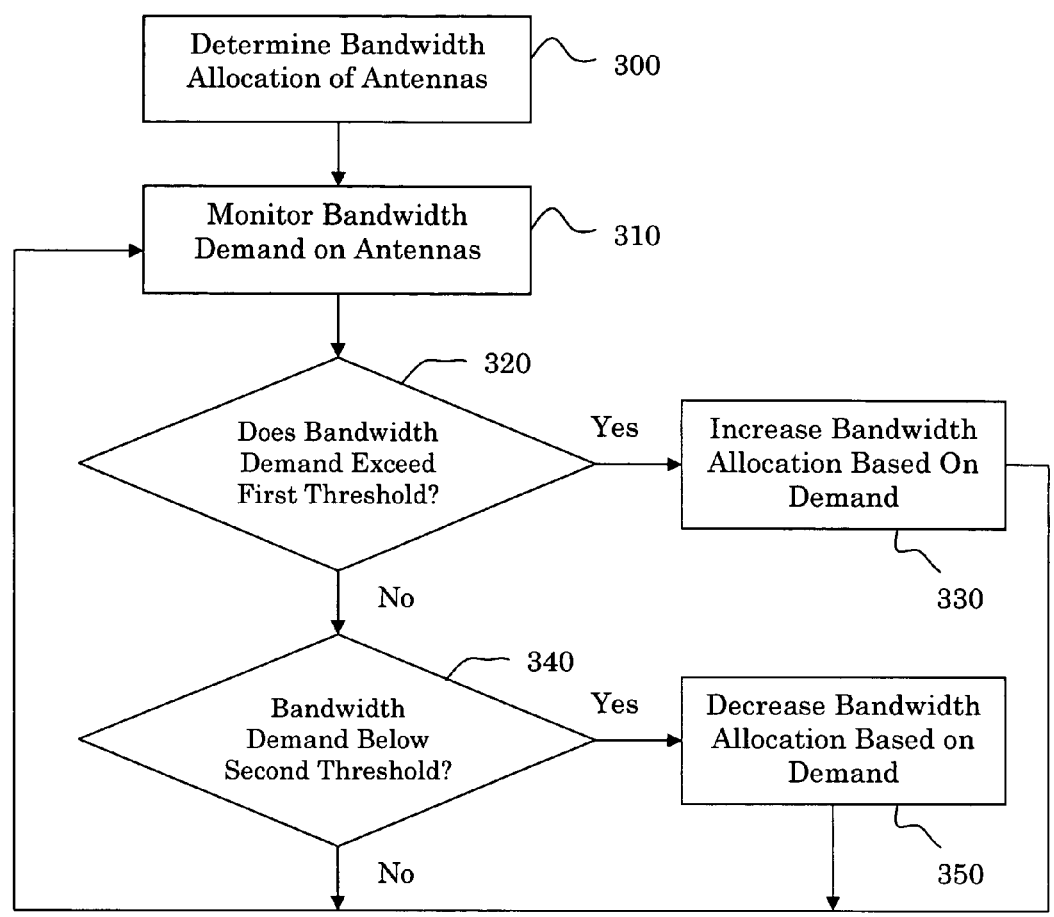
FIG. 3 illustrates an exemplary embodiment of a method for allocating bandwidth among a plurality of antennas, in accordance with the present invention.

FIG. 3 illustrates an exemplary embodiment of a method for allocating bandwidth among a plurality of antennas, in accordance with the present invention. In step 300, the bandwidth allocation of each of a plurality of antennas is determined. This determination may be performed by checking the allocated bandwidths or by using a predetermined bandwidth allocation. In accordance with the method, the bandwidth demand on each of the antennas is monitored, as illustrated in step 310. The Capacity Allocation Controller 130 of FIG. 1, for example, may monitor the bandwidth demand. In step 320, it is determined whether the bandwidth demand exceeds a first threshold.

If the first threshold is exceeded, which indicates that additional bandwidth is needed for the antenna, the bandwidth allocation is increased in step 330 for the antenna by the Capacity Allocation Controller 130, based on the bandwidth demand. If the first threshold is not exceeded, then in step 340 a determination is made of whether the bandwidth demand has dropped below a second threshold. The first and second thresholds may be determined based upon a variety of factors. Those factors may include, for example, consistency of traffic demand on each antenna, excess capacity required by each antenna to keep "blocks and drops" (instances of blocking a mobile station from connecting to the network and instances of dropping a mobile station from the network, because of excessive demand) at acceptable levels, the rate at which traffic demands change, the periodicity of the changes in traffic demand, and the time required for capacity allocation changes to take full effect.

If the bandwidth demand is below the second threshold, in step 350 the bandwidth allocation of the antenna is decreased by the Capacity Allocation Controller 130, based upon the bandwidth demand. By decreasing the amount of bandwidth allocated to an antenna that does not need its current allocation, those resources can be re-allocated to another antenna that may need the additional bandwidth. After each of step 330, the "No" branch of step 340 and step 350, the method returns to step 310 of monitoring the bandwidth demand on the antennas.

To ensure that the variation in capacity to each antenna is not service-impacting to customers, adjustments should be made that allow for a certain excess amount of capacity to each antenna at all times. Where demands are predictable, the capacity adjustments can be made gradually to roll capacity as slow or as fast as the demand changes based on the trend experience over some number of past days or months. Unpredicted shifts in traffic demand may occur from one antenna to another, so use of a dynamic algorithm for adjusting capacity allocation might also be used. The algorithm for adjusting capacity allocation could use high and low thresholds, as described above in relation to FIG. 3.

When demand reached the threshold indicating an antenna is nearly filling the capacity allocated to it (high) at the time (below its maximum capacity), the capacity allocation controller could survey the available capacity and re-allocate it to the antenna that requires more capacity. If unused but allocated capacity is costly, but unallocated capacity is not costly (i.e., in the case where one is leasing capacity using bandwidth on demand), then one might unallocate unneeded capacity when the demand on a given antenna drops below a low threshold. Where there is no savings for unallocated unneeded capacity, the Capacity Allocation Controller 130 or 230 can look for capacity allocated to another antenna where the antenna demand was below the low threshold to allocate to an antenna with demand exceeding its high threshold.

Where one is willing to allow congestion at some level, a fairness algorithm might be utilized to maintain a satisfactory level of service on each antenna rather than simply adjusting capacity to different antennas based on threshold crossings. To take care of priority customers, one might adjust the thresholds to maintain a higher amount of excess capacity (to maintain a lower likelihood of congestion) at the antennas that serve those priority customers. For example, one might maintain a larger buffer of excess capacity to antennas that serve large corporate customers than those used to service individual users in residential areas.

In another exemplary embodiment of the present invention, there is a computer-readable medium encoded with a computer program for allocating bandwidth between a plurality of antennas and a base transceiver station. The term "computer-readable medium" as used herein refers to any medium that participates in providing instructions for execution. Such a medium may take many forms, including but not limited to, non-volatile media, volatile media, and transmission media. Non-volatile media includes, for example, optical or magnetic disks. Volatile media includes, for example, dynamic memory. Transmission media includes coaxial cables, copper wire and fiber optics.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, or any other medium from which a computer can read.

An exemplary embodiment of a computer-readable medium encoded with a computer program allocating bandwidth between a plurality of antennas and a base transceiver station is illustrated in FIG. 3, which is described above.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for allocating bandwidth among a plurality of antennas in a distributed antenna system of a base transceiver station, comprising the acts of:
   determining a bandwidth allocation of a tangible transport between the base transceiver station and each of the plurality of antennas in the distributed antenna system which enable transmission and reception at the base transceiver station; monitoring a bandwidth demand of each of the plurality of antennas in the distributed antenna system;
   increasing the bandwidth allocation between the base transceiver station and at least one of the plurality of antennas in the distributed antenna system, if the bandwidth demand of the at least one of the plurality of antennas exceeds a first threshold; and
   decreasing the bandwidth allocation between the base transceiver station and another at least one of the plurality of antennas in the distributed antenna system, if the bandwidth demand of the another at least one of the plurality of antennas drops below a second threshold, wherein the first and second thresholds are based upon a rate at which the bandwidth demand of each of the plurality of antennas changes, a periodicity of changes in the bandwidth demand of each of the plurality of antennas, and a time period elapsed between increasing or decreasing the bandwidth allocation between the base transceiver station and at least one of the plurality of antennas and a stabilization of bandwidth demand at said at least one of the plurality of antennas.

2. The method of claim 1, wherein the bandwidth allocation includes an amount of excess capacity.

3. The method of claim 1, wherein the bandwidth allocation is adjusted based upon a fixed schedule.

4. The method of claim 3, wherein the bandwidth allocation is adjusted based upon predetermined bandwidth demand trends.

5. The method of claim 1, wherein the bandwidth allocation is adjusted based upon dynamic control.

6. The method of claim 1, wherein, if connections between the base transceiver stations and the plurality of antennas are wireless connections, the bandwidth allocation is adjusted by varying a number of carriers or subcarriers between the base transceiver stations and the plurality of antennas.

7. The method of claim 1, wherein, if connections between the base transceiver stations and the plurality of antennas are optical fiber connections, the bandwidth allocation is adjusted by varying a number of wavelengths or a bit rate applied to each wavelength between the base transceiver stations and the plurality of antennas.

8. The method of claim 1, wherein, if channelized SONET ports are used between the base transceiver stations and the plurality of antennas, the bandwidth allocation is adjusted using signaling to a digital cross connect.

9. The method of claim 8, wherein the digital cross connect uses virtual concatenation, generic framing procedure and a link capacity adjustment scheme.

10. The method of claim 1, wherein the bandwidth allocation is controlled over multiprotocol label switching via explicitly-routed label switch paths, resource reservation protocol-traffic extension, or constraint-based routed label distribution protocol signaling.

11. A system for sharing antenna resources in a network, comprising:
   a base transceiver station;
   a plurality of antennas disposed in a distributed antenna system of the base transceiver station to enable transmission and reception at the base transceiver station and having wired connections with the base transceiver station; and
   a capacity allocation controller configured to determine a bandwidth capacity between the base transceiver station and the plurality of antennas and a bandwidth demand of each of the plurality of antennas in the distributed antenna system and re-allocate bandwidth of at least one of the wired connections between the base transceiver station and the antennas based on the bandwidth capacities and bandwidth demands by increasing the bandwidth allocation between the base transceiver station and at least one of the plurality of antennas in the distributed antenna system, if the bandwidth demand of the at least one of the plurality of antennas exceeds a first threshold, and decreasing the bandwidth allocation between the base transceiver station and another at least one of the plurality of antennas in the distributed antenna system, if the bandwidth demand of the another at least one of the plurality of antennas drops below a second threshold,
   wherein the first and second thresholds are based upon a rate at which the bandwidth demand of each of the plurality of antennas changes, a periodicity of changes in the bandwidth demand of each of the plurality of antennas, and a time period elapsed between increasing or decreasing the bandwidth allocation between the base transceiver station and at least one of the plurality of antennas and a stabilization of bandwidth demand at said at least one of the plurality of antennas.

12. The system of claim 11, further comprising:
   a plurality of transport termination elements, each of which is connected to one each of the plurality of antennas and is configured to control the signaling between each of the plurality of antennas and the network.

13. The system of claim 11, further comprising:
   a transport distribution element including the capacity allocation controller and configured to control the signaling between the base transceiver station and the network.

14. A non-transitory computer-readable medium encoded with a computer program for allocating bandwidth among a plurality of antennas in a distributed antenna system of a base transceiver station, the computer program comprising instructions for:
   determining a bandwidth allocation of a tangible transport between the base transceiver station and each of the plurality of antennas in the distributed antenna system which enable transmission and reception at the base transceiver station;
   monitoring a bandwidth demand of each of the plurality of antennas in the distributed antenna system;
   increasing the bandwidth allocation between the base transceiver station and at least one of the plurality of antennas in the distributed antenna system, if the bandwidth demand of the at least one of the plurality of antennas exceeds a first threshold; and
   decreasing the bandwidth allocation between the base transceiver station and another at least one of the plurality of antennas in the distributed antenna system, if the bandwidth demand of the another at least one of the plurality of antennas drops below a second threshold, wherein the first and second thresholds are based upon a rate at which the bandwidth demand of each of the plurality of antennas changes, a periodicity of changes in the bandwidth demand of each of the plurality of antennas, and a time period elapsed between increasing or decreasing the bandwidth allocation between the base transceiver station and at least one of the plurality of antennas and a stabilization of bandwidth demand at said at least one of the plurality of antennas.

15. The computer-readable medium of claim 14, wherein the bandwidth allocation includes an amount of excess capacity.

16. The computer-readable medium of claim 14, wherein the bandwidth allocation is adjusted based upon a fixed schedule.

17. The computer-readable medium of claim 14, wherein the bandwidth allocation is adjusted based upon dynamic control.

18. The computer-readable medium of claim 14, wherein the bandwidth allocation is adjusted based upon predetermined bandwidth demand trends.

* * * * *